United States Patent [19]
Noland

[11] Patent Number: 4,738,206
[45] Date of Patent: Apr. 19, 1988

[54] APPARATUS AND METHOD FOR LOW TEMPERATURE THERMAL STRIPPING OF VOLATILE ORGANIC COMPOUNDS FROM SOIL

[75] Inventor: John W. Noland, West Chester, Pa.

[73] Assignee: Roy F. Weston, Inc., West Chester, Pa.

[21] Appl. No.: 907,961

[22] Filed: Sep. 16, 1986

[51] Int. Cl.$^4$ .............................................. F23G 5/02
[52] U.S. Cl. ..................................... 110/346; 432/13; 432/139; 110/226; 110/228
[58] Field of Search ................. 432/72, 139, 106, 13; 110/223, 224, 226, 227, 228, 346

[56] References Cited

U.S. PATENT DOCUMENTS

| | | | |
|---|---|---|---|
| 3,751,267 | 8/1973 | Sachnik | 432/13 |
| 4,098,200 | 7/1978 | Dauvergne | 110/228 |
| 4,167,909 | 9/1979 | Dauvergne | 110/228 |
| 4,504,222 | 3/1985 | Christian | 110/228 |
| 4,544,374 | 10/1985 | Mallek et al. | 110/226 |
| 4,628,828 | 12/1986 | Holtham et al. | 110/228 |

Primary Examiner—Henry C. Yuen
Attorney, Agent, or Firm—Austin R. Miller

[57] ABSTRACT

Apparatus and method for removing volatile and semi-volatile organic contaminants from natural soil containing moisture by sealing the soil in a stripping conveyor against contact with air and vapor stripping the contaminants at a temperature below the boiling temperatures of the contaminants.

27 Claims, 3 Drawing Sheets

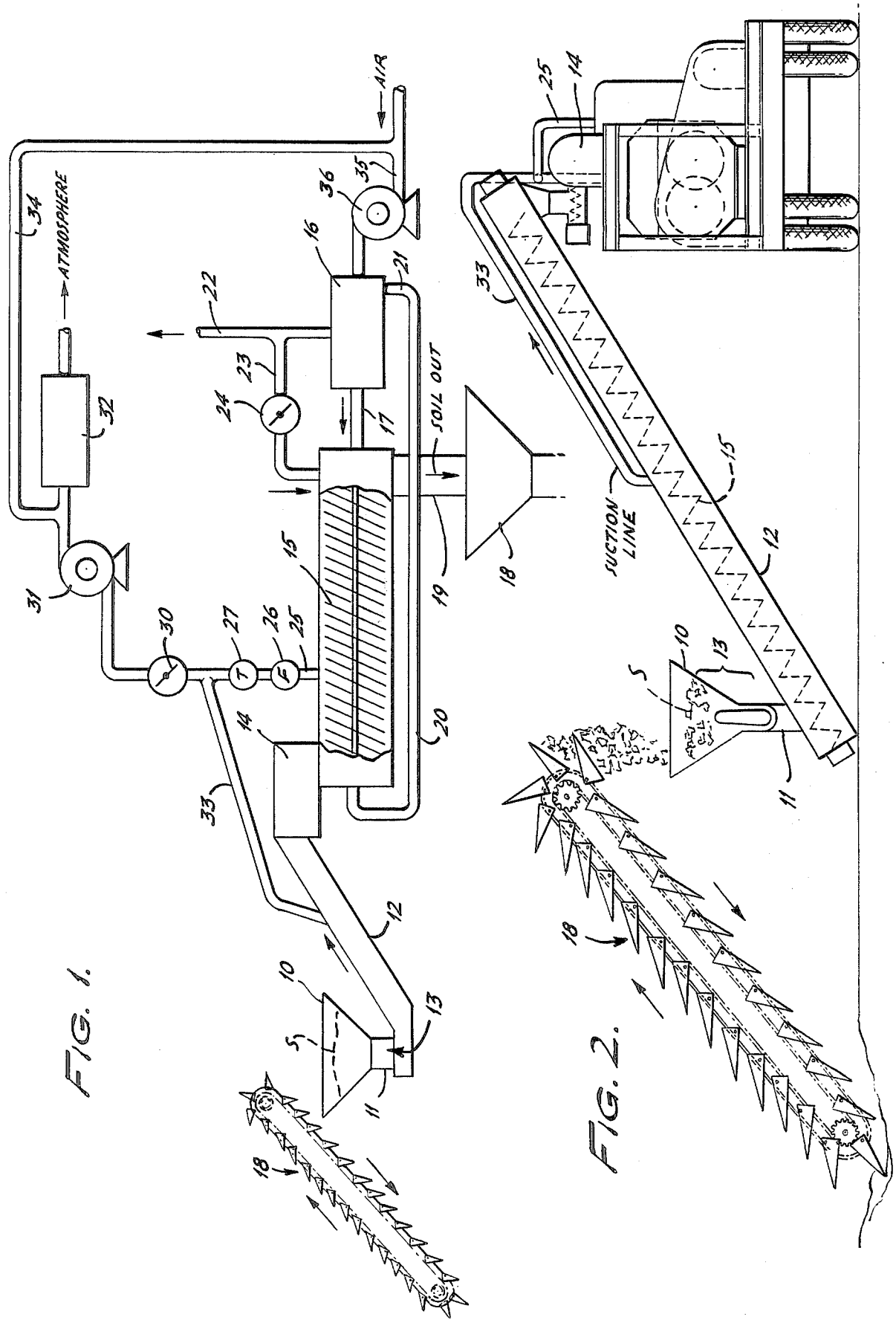

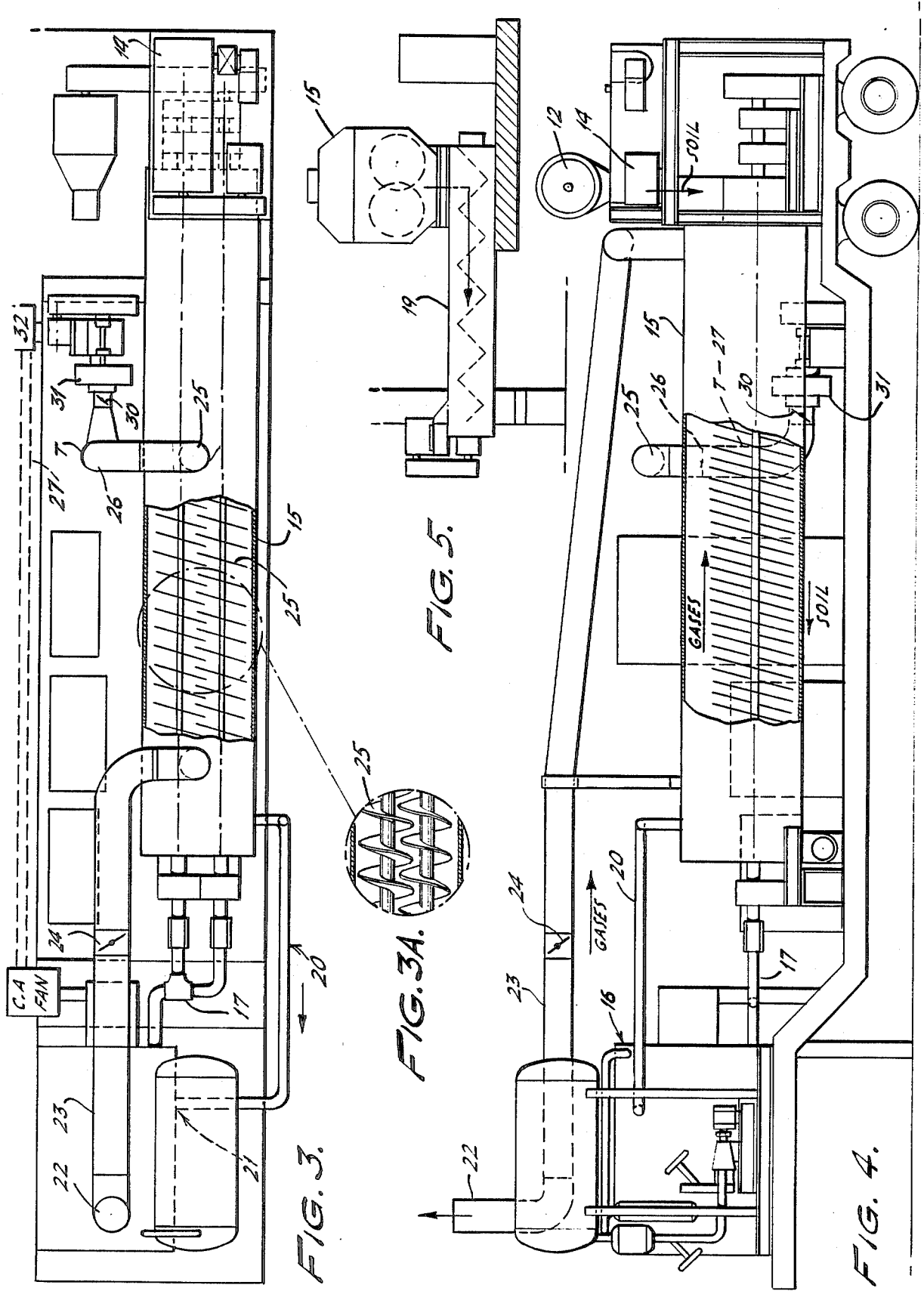

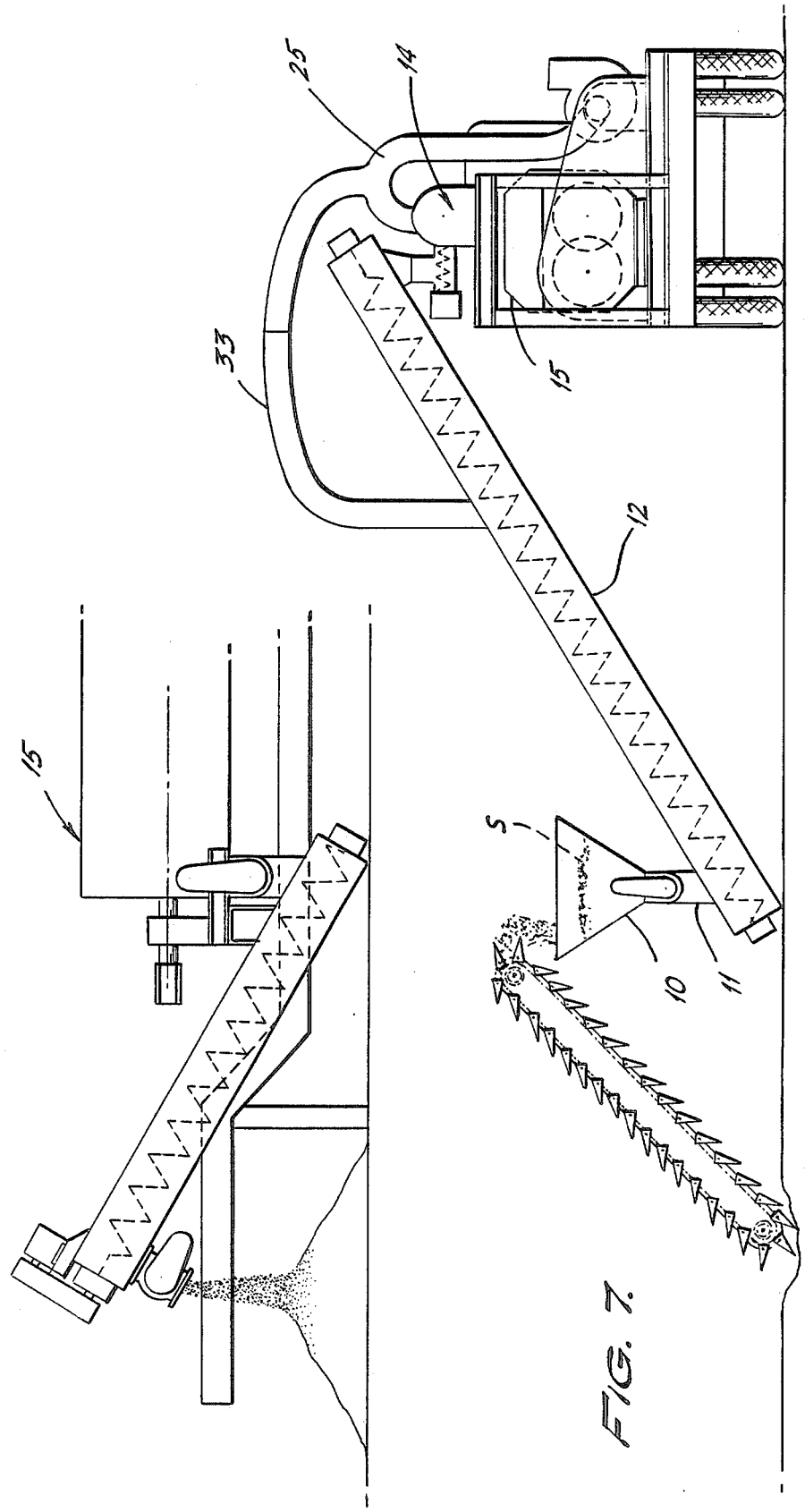

APPARATUS AND METHOD FOR LOW TEMPERATURE THERMAL STRIPPING OF VOLATILE ORGANIC COMPOUNDS FROM SOIL

The Government has rights in this invention pursuant to Contract No. DAAK11-82-C-0017 awarded by the U.S. Army Armament, Munitions, and Chemical Command. The invention described herein may be manufactured, used and licensed by or for the Government for governmental purposes without the payment to me of any royalty thereon.

This invention relates to an apparatus and method of removing volatile and semi-volatile hazardous organic contaminants from natural soil. The invention more particularly relates to the treatment of soil containing such hazardous organic contaminants whereby the contaminants are removed and the soil may be returned to the earth without pollution to the environment. The invention further relates to the removal from the earth of soil already polluted by the presence of hazardous organic contaminants, the treatment of such soil for removal of the contaminants, and the return of the soil to the earth.

In recent years it has been an important objective to treat soils contaminated as a result of industrial operations, waste, accidents or the like, and many difficulties have been experienced because of problems encountered in materials handling, high operational costs, and difficulty in achieving high levels of contaminant removal.

Contamination of soils involving volatile organic compounds has become one of the predominant environmental concerns. Trichloroethylene is perhaps the most frequently found contaminant; however, other volatile organic compounds such as dichloroethylene, tetrachloroethylene and xylene have also been found. If allowed to remain in the soil, these compounds can migrate to contaminate underlying ground waters and can lead to other hazardous conditions as well.

Although thermal stripping of dry soil has been attempted, high stripping temperatures are necessary to assure release and removal of the higher boiling organic contaminants, with serious operating and cost disadvantages.

In an entirely different field, in conjunction with off shore and inland drilling barges and rigs, drill cuttings have been treated to transform them from a wet oily condition to a clean substantially oil-free condition, by feeding them to a heating chamber having a non-oxidative environment, thereby vaporizing the hyrocarbon residue and discharging the product to the atmosphere. The patent to Sample, Jr. No. 4,139,462 discloses the use of a twin screw "Holo-Flite" heating vessel which is an indirect heat exchanger and screw conveyor that continuously heats the oil well drilling mud as the material is continuously moved through it. Problems are encountered, however, when such a drilling mud process is attempted to be applied to contaminated natural soils.

It is accordingly an object of this invention to provide an apparatus and method of removing volatile and semi-volatile hazardous organic contaminants from natural soil, to produce substantially complete removal of the contaminants, all at a relatively low temperature well below the vaporization temperature of the higher boiling organic contaminants. Another object of this invention is to provide such a method wherein the hazardous organic contaminants are removed with safety and may be discharged without environmental pollution.

Other objects and advantages of this invention, including the simplicity and economy of the same and the ease with which it may be applied to a variety of soils and combinations of contaminants contained in the soils will further become apparent hereinafter in the drawings whereof:

FIG. 1 represents a schematic diagram showing one preferred form according to which the invention may be practiced.

FIG. 2 shows a front elevational end view of a mobile form of apparatus in accordance with the present invention.

FIG. 3 depicts a top plan view of mobile apparatus utilized in accordance with the present invention.

FIG. 3A represents an exploded view of twin screw processing apparatus taken generally from the phantom circle as shown in FIG. 3.

FIG. 4 is a side elevational view of mobile soil processing apparatus of the present invention.

FIG. 5 represents a schematic cross sectional view of apparatus utilized in accordance with the present invention.

FIG. 6 is a schematic slide view of a portion of mobile soil processing apparatus of the present invention.

FIG. 7 shows a front elevational end view of mobile soil processing apparatus manifesting other aspects of the invention.

Although specific terms will be used for the sake of clarity in hereafter describing the particular form of the invention selected for illustration in the drawings, it will be realized that this description is not intended to limit the scope of the invention or to exclude the use of a wide variety of modifications.

Turning now to the drawings in general and FIGS. 1 and 2 in particular, the number 10 designates a feed hopper for the contaminated soil S, which may be removed from the earth by conventional earth removing means 18 and stored in the hopper 10, here shown as having a bottom discharge pipe 11. The number 12 designates an inclined conveyor, which may be a screw conveyor or a continuous belt conveyor, for example, having a sealed connection 13 to the bottom of the bottom discharge pipe 11.

At its upper end, the inclined conveyor 12 discharges in sealed relationship into a feed device, such as a pug mill 14, which in turn is connected sealingly to the inlet of a twin screw, indirectly heated processor 15. The processor 15 may be of the "Holo-Flite" type as disclosed in U.S. Pat. Nos. 2,731,241 and 2,753,159, provided with hollow flights having internally arranged passageways for conducting a heat transfer fluid such as hot oil, steam or the like (see FIG. 3A). Means are provided for supplying heat transfer fluids such as hot oil to the twin screw processor, comprising a hot transfer fluid or oil heater 16 having an outlet pipe 17 connected to the twin screw processor 15 to supply hot oil for indirect heating of the soil processed therein. The exit pipe 20 for hot oil is arranged to return the oil to the inlet 21 of the oil heater 16. The oil heater 16 produces combustion gas which exits through the flue pipe 22 and to the atmosphere. A branch pipe 23, provided with a damper 24, extends from the flue pipe 22 to the upper space within the twin screw processor 15, above the screw flights contained therein. It is an important and advantageous feature of this invention that the branch pipe 23 is connected at the earth exit end of the twin screw processor, for reasons which will become apparent hereinafter.

Located approximately at a middle portion of twin screw processor 15 is an exhaust duct 25 provided with a flow meter 26 and a temperature sensor 27. A damper 30 is provided in the exhaust duct 25, which also includes an induced draft blower 31 having its outlet connected to exhaust gas treatment chamber 32 the outlet of which communicates with the atmosphere.

As shown in FIG. 2, it will now be appreciated that, in operation, the soil S is conducted in a sealing relationship through the seal 13 into the inclined conveyor 12 and then, still in a sealed relationship, through the pug mill 14 into the sealed twin screw processor 15, where it is processed in intimate contact with the intermeshing worm flights which are indirectly heated through internal passageways with the hot oil introduced through the line 17 from the oil heater 16. Processed soil exits processor 15 by way of earth transporter 19 as shown in FIG. 5.

Referring to FIGS. 3 and 4, combustion gases from the oil heater 16 flow through the branch pipe 23 and the damper 24 into the earth exit end of the twin screw processor 15 and are then caused to flow above the rotating screw flights in a countercurrent manner with respect to the flow of the earth being processed. The combustion gases flow out of the twin screw processor 15 through the exhaust duct 25, past the flow meter 26 and temperature sensor 27, into the inlet of the induced draft blower 31 and then out through the exhaust gas treatment 32 to the atmosphere. Exhaust gas treatment 32 may consist of removing dust, wet scrubbing for removal of acid gases, burning organics, burning organics followed by wet scrubbing, adsorbing a portion of the hazardous constituents on activated carbon, recovery of hazardous constituents by condensation or recovery by condensation followed by adsorption on activated carbon.

Alternatively the exhaust gas may be conducted through duct 34 to combustion air inlet duct 35 and recycled to oil heater 16 by blower 36 (See FIGS. 1 and 3). This is advantageous in utilizing the combustion process in oil heater 16 for disposal (or use as an energy source) of the organic contaminants from the soil.

It has been discovered that it is important to maintain a moisture content in the soil and that this moisture performs a vapor stripping operation which allows even the higher boiling organic contaminants to be removed at temperatures far below their boiling points. Moisture is retained in the soil by virtue of the sealing relationship at 13 and 14 in the drawing, assuring that the soil fed into the twin screw processor 15 contains sufficient moisture to serve the aforesaid vapor stripping operation.

It is an important advantageous feature of this invention that the combustion gas from the oil heater 16 is a non-oxidizing gas, namely, that it is either slightly reducing or inert, and that it is introduced for countercurrent flow in the twin screw processor 15, with respect to the flow of the soil being processed. In this manner the non-oxidizing combustion gas at its highest temperature contacts the process soil when such soil is also at its highest temperature. By contrast, the non-oxidizing combustion gas is at its coolest temperature when it contacts the incoming soil, which is also at its coolest temperature. This avoids excessive removal of moisture from the incoming soil and assures the presence of sufficient moisture to perform the vapor stripping operation throughout the length of the twin screw processor 15.

It is also an important and advantageous feature of this invention that the induced draft blower 31, operating under the control and in response to the determinations of the flow meter 26 and the temperature sensor 27, provides a negative pressure within the twin screw processor 15, preventing fugitive emissions of the hazardous organic constituents. This feature combined with the utilization of the sealed system as heretofore described provides highly advantageous vapor stripping and safety as well.

It will be appreciated that the settings of the dampers 24 and 30 are regulated automatically in response to the determinations of flow meter 26 and temperature sensor 27, all in a manner known in the art per se and not shown in the drawing in order to avoid unnnecessary complications.

It will also be observed that a suction line 33 extends from the sealed inclined conveyor 12 to the exhaust duct 25. This applies negative pressure to the inclined conveyor 12, preventing fugitive emissions of hazardous organic constituents which may be released from the soil in the inclined conveyor 12.

It will accordingly be appreciated that, in accordance with this invention, soil containing volatile and semivolatile hazardous organic contaminants is treated by removing the soil from the earth by conventional earth moving means such as a front end loader or an excavator 18 as shown in FIG. 2, and placing it in a soil container such as the feed hopper 10, sealing the soil against substantial contact with the air and conveying the soil in sealed condition to a stripping conveyor provided with heated flights, heating the moisture contained in the soil by intimate contact with the heated surfaces in the stripping conveyor 15, vapor stripping the hazardous organic contaminants from the soil in the twin screw processor 15 at a temperature below the boiling temperatures of the soil contaminants with non-oxidizing combustion gases which are conducted countercurrently over the soil subjected to vapor stripping in the stripping conveyor, and controlling the temperature and flow rate of the countercurrent sweep to maintain moisture continuously present at the surface of the soil as and after the soil enters the stripping conveyor. It will further be appreciated that the provision of a negative pressure over the soil in the sealed conveyor, when non-oxidizing sweep gases are countercurrently conducted with respect to the direction of movement of the soil, not only provides a negative pressure in a manner to prevent fugitive emissions of the hazardous organic constituents but also enhances release of moisture from the soil and enhances the vapor stripping effect of the moisture in accomplishing removal of higher boiling organic contaminants at a temperature far below the boiling points of these contaminants. It has been found that the soil to be processed should reside within the processor for between about 30–90 minutes with a residence time of about between 45–60 minutes being preferred. The temperature of the exiting processed soil should be between about 120°–450° F. with a temperature of about between 140–°220° F. being preferred.

It has been determined that removal of as much as 99.99% of all organic contaminants has been continuously achieved at a production rate reaching a practical level for treatment of natural soil.

Although this invention has been described with reference to a specific form selected for illustration in the drawings, it will be appreciated that many modifications may be made, that certain steps may be performed independently of other steps, and that a wide variety of equivalent forms of apparatus may be utilized, all without departing from the spirit and scope of this invention, which is defined in the appended claims.

I claim:

1. In a method of removing volatile and semi-volatile hazardous organic contaminants from natural soil containing moisture and such contaminants the steps which comprise:
   (a) removing the soil from the earth and placing it in a soil container;
   (b) sealing the soil against substantial contact with air and conveying the soil in sealed condition to a stripping conveyor with heated flights,
   (c) vapor stripping said hazardous organic contaminants from said soil in said conveyor at a temperature below the boiling temperatures of said contaminants by driving said moisture out of said soil by volatilization of said moisture;
   (d) separately by combustion of fuel firing a heater for heating said stripping conveyor and thereby generating non-oxidizing combustion gases;
   (e) sweeping said combustion gases countercurrently over the soil subjected to vapor stripping in said stripping conveyor; and
   (f) controlling the temperature and flow rate of said countercurrent sweep to maintain moisture continuously present at the surface of the soil as and after said soil enters said stripping conveyor.

2. The method defined in claim 1, further omprising intermixing portions of said soil within said stripping conveyor with a twin screw conveyor with internally heated intermeshing flights.

3. The method defined in claim 1, further comprising applying a negative pressure to a sealed soil conveyor provided to transport the soil from the soil container to the stripping conveyor, in a manner to prevent fugitive emissions of the hazardous organic constituents.

4. The method defined in claim 3, further comprising applying said negative pressure to said soil conveyor from the exhaust from said stripping conveyor.

5. The method defined in claim 1, further including the step of maintaining the countercurrently flowing sweep gases at less than atmospheric pressure in said stripping conveyor.

6. The method defined in claim 1, further including the steps of removing and purifying the countercurrent sweep gases and discharging them to the atmosphere.

7. The method defined in claim 6, wherein the purifying step comprises removing dust.

8. The method defined in claim 6, wherein the purifying step comprises wet scrubbing for removal of acid gases from said gases.

9. The method defined in claim 6, wherein the purifying step comprises burning organics contained in said gases.

10. The method defined in claim 9, followed by the step of wet scrubbing said gases.

11. The method defined in claim 6, wherein the purifying step comprises adsorbing at least some of the hazardous constituents on activated carbon.

12. The method defined in claim 6, including the further step of recovering at least one of the hazardous constituents by condensation.

13. The method defined in claim 12, followed by the further step of adsorption on activated carbon.

14. The method defined in claim 1, further including the step of returning the purified natural soil to the earth.

15. The method defined in claim 1, wherein the step of heating the moisture contained in the soil comprises burning a fuel with combustion air, and wherein countercurrent sweep gases are returned to said burning step along with said combustion.

16. Apparatus for removing volatile and semi-volatile hazardous organic contaminants from natural soil containing moisture and such contaminants, comprising:
   (a) a soil container for the earth;
   (b) sealing means for sealing the soil against substantial contact with air;
   (c) a stripping conveyor comprising a screw conveyor with internally heated intermeshing flights;
   (d) means for conveying soil in sealed condition, including a sealed soil conveyor provided to transport soil from the soil container to the stripping conveyor;
   (e) means for applying a negative pressure over soil in said sealed conveyor in a manner to prevent fugitive emissions of the hazardous organic constituents;
   (f) means for heating the moisture contained in the soil by intimate contact with heated surfaces in said stripping conveyor, thereby vapor stripping said hazardous organic contaminants from said soil in said conveyor;
   (g) a fuel burner connected for heating said stripping conveyor and thereby generating non-oxidizing combustion gases;
   (h) means for conveying said combustion gases countercurrently over the soil subjected to vapor stripping in said stripping conveyor; and
   (i) control means connected for controlling the temperature and flow rate of said countercurrent sweep to maintain moisture continuously present at the surface of the soil as and after said soil enters said stripping conveyor.

17. The apparatus defined in claim 16, wherein said negative pressure is applied from the exhaust from said stripping conveyor to said soil conveyor.

18. The apparatus defined in claim 16, further including means for maintaining the countercurrently flowing sweep gases at less than atmospheric pressure in said stripping conveyor.

19. The apparatus defined in claim 16, further including means for removing and purifying the countercurrent sweep gases and discharging them to the atmosphere.

20. The apparatus defined in claim 19, wherein the removing and purifying means comprises means for removing dust.

21. The apparatus defined in claim 19, wherein the purifying means comprises a wet scrubber for removal of acid gases from said gases.

22. The apparatus defined in claim 19, wherein the purifying means comprises a burner for burning organics contained in said gases.

23. The apparatus defined in claim 22, comprising a wet scrubber downstream of said burner.

24. The apparatus defined in claim 19, wherein the purifying means comprises means for adsorbing at least some of the hazardous constituents on activated carbon.

25. The apparatus defined in claim 19, further including means for recovering at least one of the hazardous constituents by condensation.

26. The apparatus defined in claim 25, further including means for adsorption on activated carbon.

27. The apparatus defined in claim 16, further including conveyor means for returning the purified natural soil to the earth.

* * * * *